United States Patent Office.

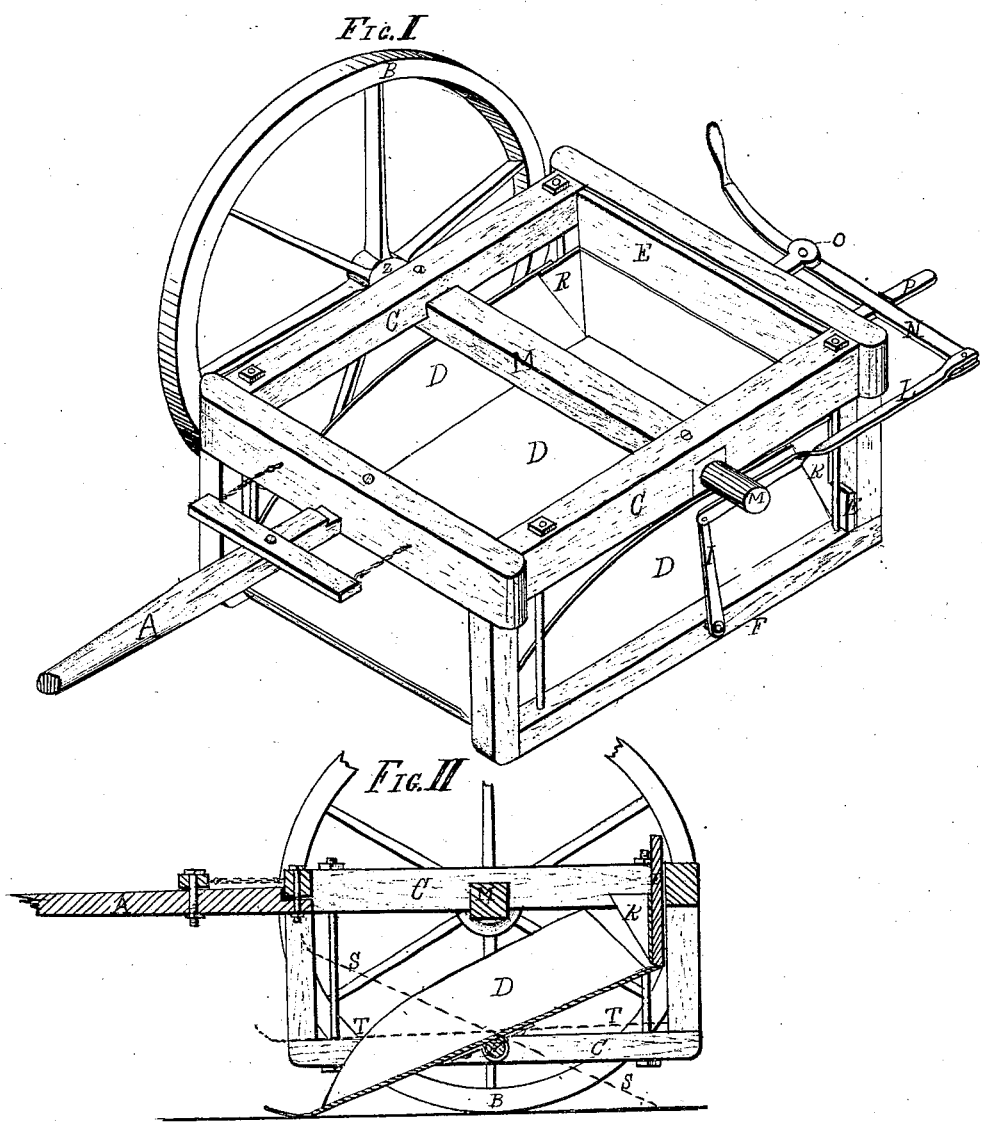

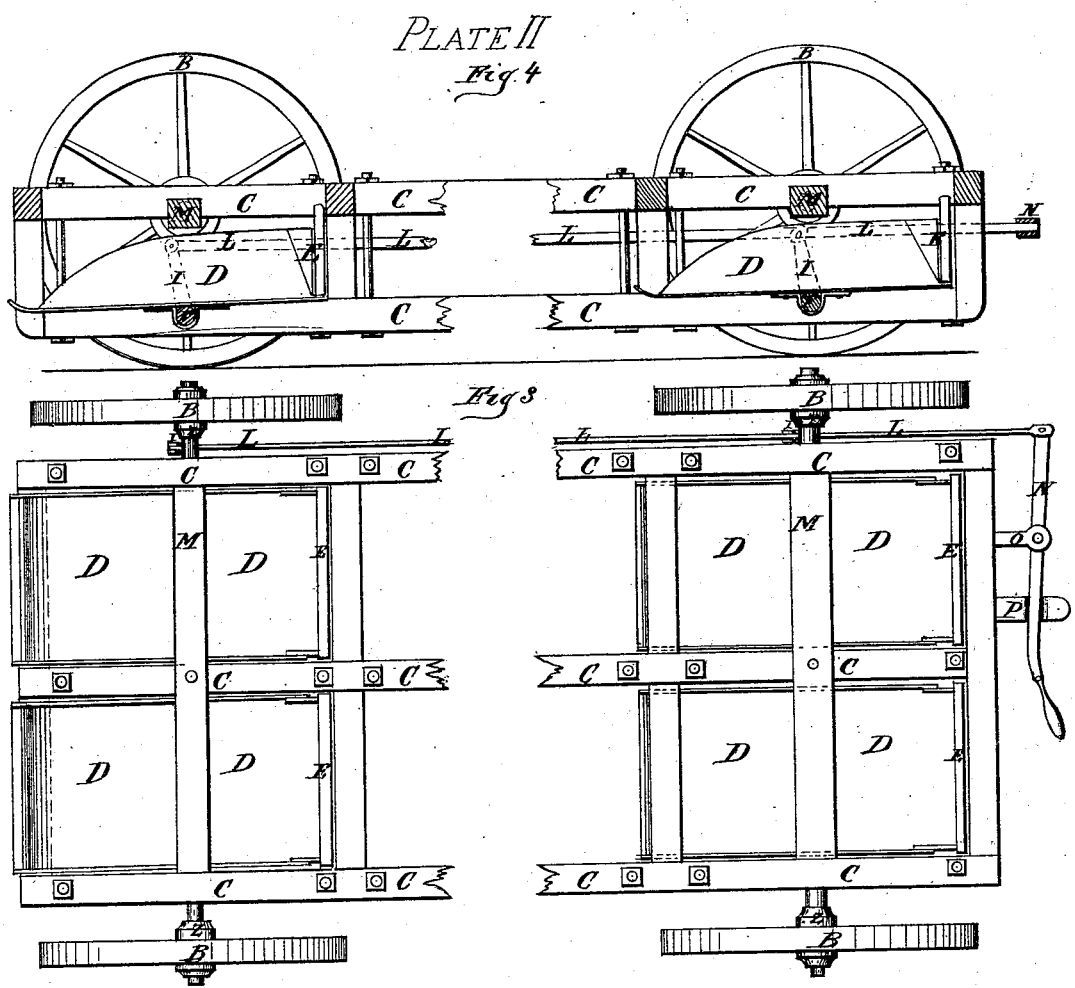

JAMES PRESTON, OF ATCHISON, KANSAS.

Letters Patent No. 102,706, dated May 3, 1870.

IMPROVEMENT IN GRADING-MACHINE.

The Schedule referred to in these Letters Patent and making part of the same.

*To all whom it may concern:*

Be it known that I, JAMES PRESTON, of the city and county of Atchison, in the State of Kansas, have invented certain new and useful Improvements in Graders, of which the following is a specification, reference being had to the accompanying drawings.

Nature and Objects of the Invention.

The invention relates to that class of graders which are suspended upon and transported by wheels, and which use single-edged shovels, turning on an axle less than a complete revolution, depositing or dumping the earth to the rear.

The object of the invention is to present the filling edge of the shovel so as to take up the earth, and hold it in such position while the vehicle moves forward until the shovel is loaded, then to raise its front edge and lower its rear, bringing it to a horizontal position, in which it may be transported; then to elevate the front edge and lower the rear part of the shovel, and dump the load, all by means of a lever or levers, connecting-rod or rods, and arms, combined.

Description of the Accompanying Drawings.

Plate I—

Figure I, is a perspective view of my improved grading-machine.

Figure II is a sectional elevation of the same, showing the shovel D in the operation of taking up the earth.

Plate II—

Figure III is a plan view of the same, when combined in groups of four shovels.

Figure IV is a side elevation of the same, showing four shovels in position for transporting the earth.

General Description.

A in the accompanying drawings represents the shafts or thills properly secured to the axle M or box-frame C.

B are the wheels.

Z are the hubs.

C is the box-frame, its lower front horizontal bar being cut out, and the space between its rear vertical bars and tie-rods forming an open slot, in which the slide E moves.

Under the axle M, in journals, on opposite sides of the lower side bars of the frame C, and inside of the wheels B, is a shovel-axle, F, to which the shovel D is fixed on its under side by straps or bands.

To one extremity of the axle F, between the wheel and frame, the lower end of an upright arm, I, is rigidly secured, the other end of which is pivoted to the fore-end of a connecting-rod, L, under the hub of the wheel.

This connecting-rod passes horizontally to the rear between the wheel and frame, projecting beyond the latter, where it is pivoted to the end of a lever, N, working on a standard fulcrum, O, projecting at right angles from the rear surface of the upper rear bar of the frame C. About midway between the fulcrum and the end of the lever is a spring, P, projecting at right angles from the rear of the last-mentioned bar, its under side being in the same plane as the under side of the fulcrum. It is provided with a catch or catches to hold the lever N in position, and its action is from below against the under side of the lever.

The shovel is located inside of the lower part of the frame C. Its front has an inclined or curved scooping edge. Its sides are vertical, and their rear edges slant downward from top to bottom. The rear is open. The bottom of the shovel extends to the rear beyond the sides a distance equal to the thickness of the slide E.

The slide E has, on the lower part of its ends, tongues of about one-third its height, which move in the space between the rear upright bars and tie-rods of the frame, and is faced on its front surface with a metal plate of about the same height as the sides of the shovel, the ends of which plate are provided with flanges R, projecting forward at right angles from the surface of the slide, and, when the shovel is in a horizontal position, fit inside of the rear ends of its sides, and fill up the space behind the rear end of the sides of the shovel D, the balance of the plate closing the end thereof.

The shovel may be provided with plow-points, or other pointed projections upon its scooping or cutting-edge.

The shovel being in a horizontal position, to fill it, press down the spring P until the lever is free; then retract the same; this forces the connecting-rod L forward, and it, acting upon the arm I, causes the latter to move the shovel D, so that its edge is presented to the earth, at the same time the tail of the shovel raises the sliding bar E. A forward motion now being given to the machine, the earth passes into the shovel, the slide E preventing its escaping from the back.

To transport the shovel thus loaded, free the lever and force it forward. The connecting-rod L and arm I are thus drawn backward, and the shovel D brought to a horizontal position, at the same time the slide E descends with the descent of the rear end of the shovel D, and, when the same reaches a horizontal position, the slide closes the rear end and openings on the sides thereof resting upon that portion of the lower bars of the frame C, between the rear vertical bars and tie-rods. The load may now be moved to the place of deposit.

To dump the load, free the lever N and force it forward. This elevates the front edge of the shovel D and lowers its rear end. The earth will now pass backward through the opening below the lower rear bar of the frame C, and above the tail of the shovel.

The spring P, in the present instance, is provided with but one catch. It is obvious that more may be used.

The loading, carrying, and dumping positions of the shovel D are shown respectively by the letters D T S.

Plate II shows the invention when arranged in series of two shovels on each axle F, and each pair of wheels provided with two shovel-axles. The operation in this case is entirely analogous to the use of but one shovel on one axle, with this change: the connecting-rod L is elongated and pivoted to the upper ends of the arms I; thus all of the shovels may be operated by the same connecting-rod and lever, the shovels being hung on axles common to such thereof as are intended to be operated by each of the arms I, and in all respects otherwise similarly provided, each with frame C, slide E, &c., the frames being hung on the axles M, or such thereof as may be required, side by side.

From the above it is evident that the invention may be used in a greatly multiplied form, and also that the shape of the shovels D may be different, so as to adapt the machine to use in different kinds of soil.

*Claims.*

What I claim as my invention, and desire to secure by Letters Patent, is—

1. The arrangement and combination of the connecting-rod L with the lever N and arm I rigidly attached to the shovel D, by means of which the latter can be operated, in the manner as herein shown and described.

2. The combination of the shovel D and the slide E, substantially as herein shown and described.

In testimony that I claim the foregoing improvements in graders, as above described, I have hereunto set my hand and seal this 29th day of March, 1870.

JAMES PRESTON. [L. S.]

Witnesses:
    JOHN C. COX,
    EDM. F. BROWN.